United States Patent [19]

Galloway

[11] 4,155,790
[45] May 22, 1979

[54] CONTINUOUS MANUFACTURE OF REINFORCED HOSE

[75] Inventor: Frederick M. Galloway, Bellefontaine, Ohio

[73] Assignee: H. K. Porter Company, Inc., Pittsburgh, Pa.

[21] Appl. No.: 758,809

[22] Filed: Jan. 12, 1977

[51] Int. Cl.² .................................... B29B 17/02
[52] U.S. Cl. ........................ 156/149; 156/244.12; 264/121; 264/173; 264/174; 264/231; 264/236; 264/347
[58] Field of Search ............. 264/173, 174, 236, 347, 264/121, 231; 156/149, 156, 385, 244, 244.12

[56] References Cited

U.S. PATENT DOCUMENTS

| | | | |
|---|---|---|---|
| 2,463,288 | 3/1949 | Leguillon | 264/347 |
| 3,072,968 | 1/1963 | Watson et al. | 264/347 |
| 3,242,528 | 3/1966 | Elder | 264/DIG. 51 |
| 3,586,558 | 6/1971 | Galloway et al. | 156/244 |
| 3,794,705 | 2/1974 | Harley | 264/37 |

FOREIGN PATENT DOCUMENTS

692022 8/1964 Canada .................................... 264/231

*Primary Examiner*—Jeffery R. Thurlow
*Attorney, Agent, or Firm*—W. Wyclif Walton

[57] ABSTRACT

This invention constitutes an improvement upon the existing practice of manufacturing reinforced automotive heater hose and the like in a continuous operation which comprises continuously extruding an elastomeric tube, continuously applying to the outer surface of the tube an appropriate reinforcing layer of textile yarns or the like, continuously extruding over the reinforcing layer an elastomeric covering layer, and continuously curing the elastomeric components in an elongated chamber containing heat exchange elements the improvement residing in the provision of a method and means for elongating within certain limits the uncured or partially cured hose during the curing process whereby reduction of pressure and temperature within the extruding units and other advantages in production of reinforced automotive heater hose and the like may be realized.

5 Claims, 3 Drawing Figures

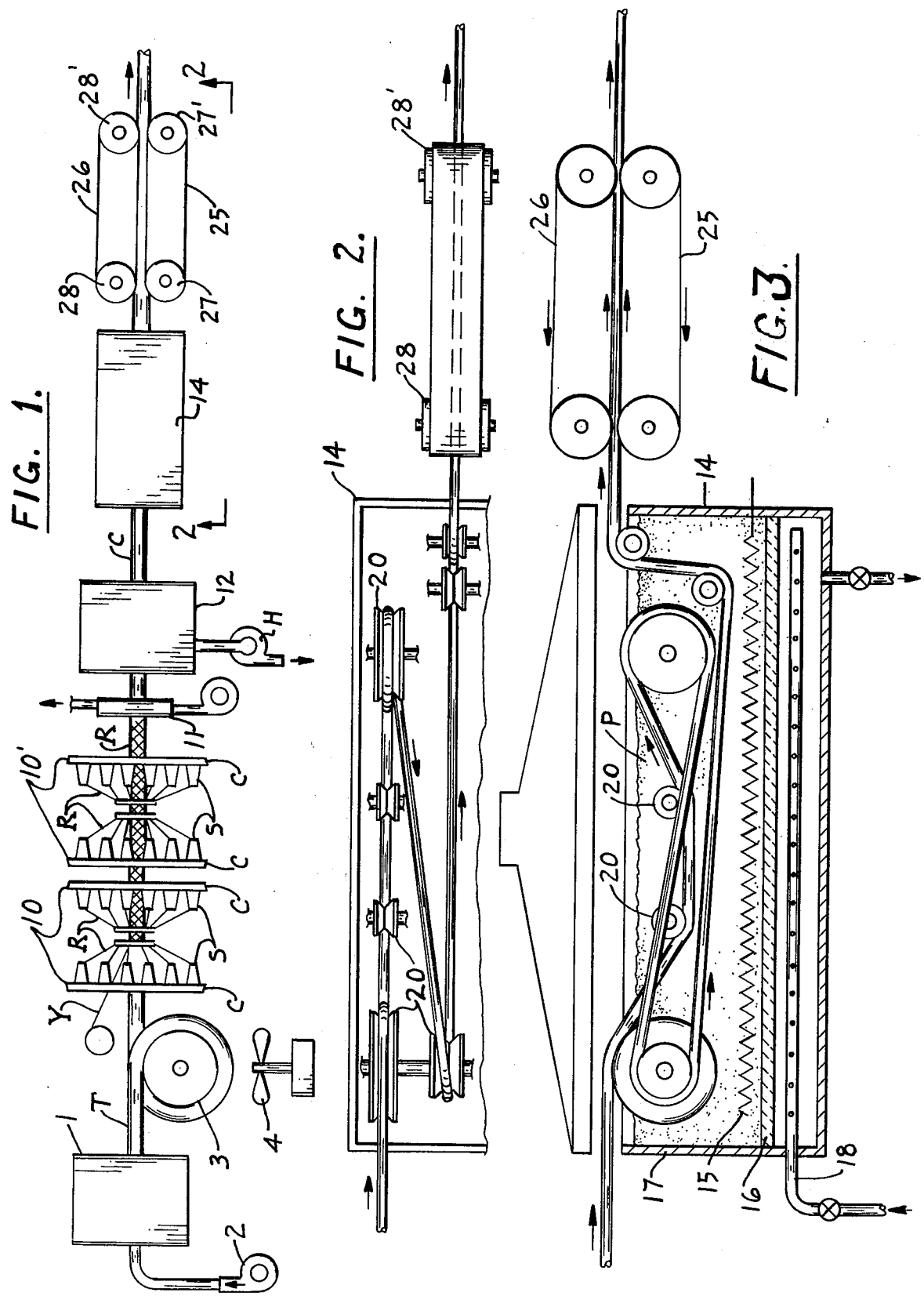

CONTINUOUS MANUFACTURE OF REINFORCED HOSE

CROSS REFERENCE TO PRIOR PATENT

The present invention is an improvement over the practice disclosed in prior U.S. Pat. No. 3,586,558 granted June 22, 1971 to the present inventor and others in that it affords enhanced production of reinforced automotive heater hose and the like by utilization of substantially the same equipment required in accordance with said patent upon certain modifications being made and the utilization of certain auxiliary equipment adapted to effect the longitudinal elongation of the unfinished hose during curing of its elastomeric components, to produce the finished hose at an enhanced rate of linear production while minimizing risk of mishap due to excessive temperatures or pressures at the extruding stations in the production line.

BRIEF SUMMARY OF THE INVENTION

In the production of reinforced hose in accordance with the practice disclosed in said patent the rate of linear extrusion of the elastomeric inner tube forming the innermost layer of the finished hose is closely related to the rate of linear production of finished hose, the operations to which the inner tube is subjected in its passage through the reinforcement applying stations, the elastomeric covering extrusion unit and the curing unit usually causing a slight increase in the length of hose produced as compared with the extruded length of the inner tube. In accordance with the present invention, however, for the same extrusion speed of the inner tube a positive and material longitudinal elongation is effected through a predetermined stretching operation whereby a production rate for the finished hose up to 40% or more faster than the rate of linear extrusion of the inner tube can be attained, with the finished hose in every respect conforming exactly to specifications established for the hose produced in accordance with the procedure of the said patent.

BRIEF DESCRIPTION OF THE DRAWING

In the accompanying drawing:

FIG. 1 is a diagrammatic side elevation of apparatus comprised in a typical production line for manufacture of reinforced automotive heater hose and the like in accordance with the present invention;

FIG. 2 is an enlarged diagrammatic fragmentary horizontal section partly in top plan view of certain of the mechanical units included in the said production line, as designated by the line 2—2 in FIG. 1;

FIG. 3 is a diagrammatic fragmentary side elevation partly in vertical section of the units illustrated in FIG. 2.

DESCRIPTION OF THE PREFERRED EMBODIMENT

In the drawing in which relative dimensions are exaggerated there is diagrammatically represented the essential components of production line for manufacture of reinforced automotive heater hose substantially such as is disclosed in said prior U.S. Pat. No. 3,586,558 with the addition thereto of a unit for elongating the hose during the curing of its elastomeric components at the curing station, the modifications of other units imposed by the present invention, while not readily susceptible of illustration will be hereinafter more fully described.

The apparatus constituting the production line thus comprises an extruder 1, certain details of which will hereinafter more fully appear, designed to produce a continuous elongated tubular article T which becomes the elastomeric inner layer of the finished hose; connected with the extruder 1 in such manner as to enable a slightly elevated pressure to be maintained in the inner tube T as it is being produced is a source of air under pressure diagrammatically indicated as a centrifugal pump 2.

The inner tube T as it issues from extruder 1 is subjected to cooling to reduce its temperature below that induced in the extruder by internal friction as by being passed about a rotating drum 3 cooled by a fan 4, after which the tube passes to a reinforcement applying unit 5. A nylon or other suitable yarn Y is here applied to the tube in parallelism with its longitudinal axis for a purpose which will later appear as the tube enters reinforcement applying apparatus which in accordance with the preferred practice includes a pair of lapping units, 10, 10' each comprising a pair of carriers C on which are mounted a plurality of spools S containing reinforcement yarns R or the like of which the hose reinforcement is formed. The provision of these lapping units enables the exhausted spools S of one to be replaced while the other unit is in operation and thus avoid interruption in the continuity of hose production due to exhaustion of the supply of yarn on the lapper spools.

After the inner tube T has passed through the reinforcing unit whereby reinforcement R is applied to its outer surface it then passes through a flash heater 11 in which it is momentarily subjected to impingement of a blast of highly heated air, at a temperature of the order of 400° to 1000° F. (205°–538° C.) for rapidly vaporizing any moisture or other volatile matter carried by the reinforcement. From this drying unit 11 the hose passes directly to a second extruder 12, preferably one equipped with suction apparatus H effective to minimize entrapment of air in the reinforcing layer, as an elastomeric covering layer C is extruded over it. The now covered but uncured hose next passes to a continuous curing unit 14 preferably one of the so-called "fluid-bed" type comprising minute particles P of an inert inorganic material such as a silica sand, maintained at elevated temperature and in a state of constant agitation by a heating unit 15 and air jets injected through the porous inner bottom 16 of an elongated container 17 from a perforated pipe 18.

In the container 17 there are disposed a plurality of idler guide sheaves 20 about which the uncured hose is festooned for repeated passes through the fluid bed comprising the heated particles P wherein its elastomeric components are subjected to curing heat through contact of the heated particles and the hot air in which they are entrained.

The hose is maintained under tension in the curing chamber by operation of a pair of cooperating endless friction belts 25, 26 passing over pairs of driven rollers 27, 27', 28, 28' actuated by any suitable prime mover (not shown) whereby a continuous attenuating tension or draft may be exerted to stretch the hose longitudinally within its elastic limits, and those of the tracer yarn Y, in accordance with principles which will now be more fully discussed.

By way of example, but not by way of limitation there are hereinafter recited pertinent data derived from a successful test run in accordance with the invention during which apparatus such as that hereinbefore generally described was operated to produce reinforced elastomeric automotive heater hose of nominal ⅝" (1.5875 cm.) I.D.

The first extruder, corresponding to extruder 1, FIG. 1 was equipped with an extrusion die having an extrusion port of 57/64 (0.890)" (2.606 cm.) I.D. and a pin, coaxial with said port to form the bore of extruded inner tube T (FIG. 1) having I.D. of 33/64 (515)" (1.3081 cm.) which produced a tube of 7/64 (0.109)" (0.2769 cm.) gauge or wall thickness when internal air pressure was maintained in the tube equivalent to 20 inches (50.8 cm.) of water. This tube as it was produced by the extruder from a selected elastomeric compound constantly fed to the extruder issued from the latter, due to heat generated in the extruder, at a temperature in the neighborhood of 180° F. (80.2° C.) and as it passed to the reinforcing units a continuous tracer yarn consisting of 840/1/3 ply high twist yarn specifically RFL treated yarn designated M-486C by its supplier, Ludlow Textiles, of Ludlow, Maine, was applied to its outer surface in parallelism with its axis. This yarn, having elongation at break of 42% under atmospheric temperature conditions affords 55% elongation at 356° F. (180° C.) with yield of 1260 yd. per lb. (2540.6 M/Kg.). As the tube entered and passed through the reinforcing units a reinforcement comprising 20 ends of duPont nylon type 715, 840 denier single ply yarn was applied to it over the tracer yarn in spirals of opposite hand having a pitch of 89/64 (1.390)" (3.5306 cm.) and the reinforced tube then passed through the flash heater (11) and into the second extruder 12.

The pitch angle of the yarn in the reinforcement was made appreciably smaller than specified for the ultimate hose, attained by increasing the rotational speed at which the reinforcing units were operated, as compared with their speed in relation to the rate of linear extrusion of the tube in heretofore customary practice. This anticipated that the pitch angle would be widened to normal for the finished hose when the reinforcement was later attenuated, with the elastomeric components, as will hereinafter appear.

In the second extruder 12 a covering of the same elastomeric compound as used in the inner tube T was applied over the reinforcement through an extrusion die of 71/64 (1.109)" (2.8169 cm.) I.D. producing a cover of 3/64 (0.046)" (0.1168 cm.) wall thickness at a temperature at the throat of the extrusion die of 190° F. (87° C.). The reinforced and covered tube next entered and passed through the curing unit wherein at a temperature closely held to 365° F. (185° C.)±18° F. (10° C.) it was subjected to five passes through the fluid bed and attenuation through the draft of the withdrawing unit (25, 26) and an exit speed of 84 ft. (25.906 m.) per minute, or approximately 40% faster than the rate of egress of the inner tube from the first extruder.

The finished hose, within acceptable tolerances, was found to have O.D. of 58-61/64 (0.906-0.953)" (2.3012-2.4206 cm.) measured over a 0.625" (1.5875 cm.) plug and I.D. 39-41/64 (0.609-0.640)" (1.5469-1.6256 cm.). The finished hose, per 100 linear feet (30.4801 m.) weighed 21.680 pounds, (9.8322 kg.) or approximately 32.2578 kg. per 100 meters. Of this total weight the inner tube accounted for 54.57%, the yarn reinforcement, 1.15% and the outer cover 44.28%.

It will be evident from the foregoing that the hose may be produced in accordance with the invention utilizing extrusion orifices appreciably larger than heretofore, yet producing hose of the same dimensions and characteristics, whereby temperatures and pressures in the extrusion chambers may be materially reduced to minimize the risk of scorching of the elastomeric compound, or actuation of safety devices incorporated in the extrusion apparatus to avoid damage from excessive pressures, while substantially (up to 40% or more) increasing the linear amount of hose produced per unit of time.

It will be appreciated that in commercial operation of a hose manufacturing line in accordance with the said Galloway et al. patent it has been found that the maximum practical take-off speed of the finished hose has been in the neighborhood of 67.5 ft. per min. (20.574 m/min.) or approximately 28,980,000 ft. per year (8,937,432 m./yr.) whereas in accordance with the present invention identical hose can be produced at 94.5 ft. per min. (28.8036 m/min.) or approximately 34,020,000 ft. per yr. (10,369,296 m/yr.) or an increase of 5,040,000 feet per year (1,536,192 m/yr.) at relatively nominal additional cost for additional power, the material consumed per foot of hose produced being the same as in the prior practice.

It will be appreciated that as the hose is elongated in the fluid bed curing unit or other appropriate apparatus providing a heat exchange zone in which the hose may be subjected to temperatures adequate for vulcanizing its elastomeric components the tracer yarn Y is correspondingly stretched lengthwise, preferably to an extent approaching its elastic limit, which affords a measure of control of the extent to which the attenuating belts 25, 26 elongate the hose. As the tracer yarn is heated concurrently with the heating of the hose, some of its internal stresses are relieved as the elastomeric components of the hose become cured, so there is little or no tendency for the tracer yarn to retract longitudinally in the finished hose although it may remain under slight tension stress.

While so called fluid-bed apparatus has successfully been employed in the practice of the invention to provide a heat exchange zone for imparting vulcanizing heat to the elastomeric components of the hose, said apparatus comprising a mass of heated particles of relatively inert preferably inorganic substance maintained in continuous agitation by passage of air jets therethrough while heat is supplied to the particles by appropriate electrical resistance heating means, the invention contemplates the utilization of other specifically different means for maintaining a heat exchange zone in which the elastomeric components of the hose may be progressively and continuously vulcanized, not excluding the utilization of a mass of molten material such as a salt bath, in lieu of the ballotini of the fluid bed apparatus, or the hose may be heated by induction through microwave generation of internal resistance heating effects, or by a combination of a plurality of heating units, of which a considerable variety is readily available in the market place.

I claim:

1. The method of producing elastomeric reinforced hose which comprises the steps of continuously extruding through an annular extrusion orifice an inner elastomeric tube, progressively cooling said tube, progressively applying to the outer surface thereof a reinforcement of filamentary material including a strand of elastic material paralleling the tube axis, progressively subjecting the reinforced tube to external vacuum while extruding over its outer surface an elastomeric covering layer, bonding said layer to the inner tube through interstices in the reinforcement, passing the covered tube progressively through a zone of heat treatment to impart vulcanizing heat to the elastomeric components thereof and maintaining an attenuating longitudinal stress in the covered tube to progressively elongate the same and said strand to an extent substantially corresponding to the elongation possible within the elastic limits of said strand until the elastomeric components of the hose have been vulcanized, progressively withdrawing the hose from the zone of heat treatment while continuing to subject it to longitudinal tension, said longitudinal tension exerting an attenuating stress imposing upon the hose elongation of approximately 40% in relation to the length of inner tube issuing from the first extrusion orifice and finally relieving said tension and separating the hose into pieces of finite length.

2. A method as defined in claim 1 in which the hose is passed through friction means exerting radial pressure against it to induce therein said attenuating longitudinal stress.

3. A method as defined in claim 1 in which the rate of withdrawal of the hose from the heat-exchange zone is at a linear velocity substantially greater than the linear velocity of extrusion of the inner tube from the first extrusion orifice.

4. A method as defined in claim 1 in which said strand of elastic material comprises a longitudinally extensible yarn applied to the inner tube within the covering layer which is elongated substantially to its elastic limit while the hose is being subjected to attenuating stress.

5. A method as defined in claim 1 in which said heat exchange zone contains a mass of heated particles of inert inorganic material continuously agitated by passing a plurality of streams of gaseous fluid therethrough.

* * * * *